United States Patent [19]

Wick et al.

[11] 3,904,732

[45] Sept. 9, 1975

[54] METHOD FOR IMPROVING TRANSPARENCY OF THERMALLY DAMAGED ACRYLIC GLAZING

[75] Inventors: Reyburn Wick; Kenneth A. Green, both of Southampton, Pa.

[73] Assignee: The United States of America as represented by the Secretary of the Army, Washington, D.C.

[22] Filed: Oct. 22, 1974

[21] Appl. No.: 516,857

[52] U.S. Cl. ................. 264/341; 106/13; 106/311; 252/70
[51] Int. Cl.² ........................................ B29C 25/00
[58] Field of Search ............ 117/2; 264/1, 341, 343; 252/70; 106/2,13

[56] References Cited
OTHER PUBLICATIONS
Chem. Abst. 67: 33219q 1967.

*Primary Examiner*—Theodore Morris
*Attorney, Agent, or Firm*—Nathan Edelberg; Robert P. Gibson; Arthur M. Suga

[57] ABSTRACT

Means for instantaneously temporarily restoring visibility to acrylic glazing of military helicopters where the glazing has been rendered opaqued or frosted by exposure to enemy laser radiation and comprising applying a mixture, preferably 50 percent by volume, of tetrachloroethylene and trichloroethylene to said glazing.

3 Claims, No Drawings

METHOD FOR IMPROVING TRANSPARENCY OF THERMALLY DAMAGED ACRYLIC GLAZING

The invention described herein may be manufactured, used and licensed by or for the Government for governmental purposes without the payment to us of any royalty thereon.

This invention relates to acrylic glazing and more particularly concerns means for immediately, if only transiently, restoring transparency thereto, when rendered opaque or frosted by thermal or laser radiation.

Military helicopters employ canopies of acrylic glazing, such for example as Lucite or Plexiglas, both well-known polymethylmethacrylates, a product of du Pont and Rohm and Haas respectively. Enemy laser radiation can render acrylic glazing unfit for viewing therethrough almost instantaneously. Although past laser efforts for these purposes have been directed principally to 3.8 and 10.6 $\mu$m wavelength radiation, any infared wavelength can frost or opacify acrylic glazing if exposed thereto for a sufficient duration if of sufficient wattage. For example, a frosted acrylic surface which will prevent viewing therethrough will occur in less than 1 second if the intensity of the radiation approximates 35–40 watts/cm$^2$. Doubling the intensity will approxiamtely halve the time needed before frosting or opacity results to the canopy acrylic glazing. It is apparent therefore that extremely short bursts of high intensity radiation can instantaneously render acrylic glazing unfit for any viewing purposes from military aircraft.

It is therefore an object of this invention to provide means for rendering military canopy acrylic glazing suitable for immediate viewing therethrough, albeit transitory, when said glazing has been thermally damaged by laser radiation.

Other and further objects of the invention will become apparent as the invention is further hereinafter described.

Briefly, we have discovered that polymethylmethacrylate glazing material which has been frosted or opaqued by laser radiation can immediately be made transparent by application thereto of a liquid having a refractive index similar to the acrylic glazing material's refractive index.

More specifically, when a 50 percent by volume mixture of tetrachloroethylene and trichloroethylene are applied to the frosted or opaqued acrylic glazing surface, an immediate and very substantial improvement in the transparency of the acrylic glazing results.

The mixture above-referred to may be applied by any suitable means, its actual method of application forming no part of this invention. Any dispensing means, such for example, as used in automobiles wherein a windshield washing fluid is caused to be applied to dirty windshields has been found to work admirably well with our mixture. The acrylic glazing remains viewable for as long as 15 to 30 seconds after application thereto depending upon speed of the aircraft, ambient temperature, humidity, quantity of mixture applied, and the like. The mixture suffuses the thermally damaged area instantly to render it once again transparent. The theory or underlying scientific principle which makes our invention operable is believed to reside in the ability of the mixed chloroethylenes to completely and almost instantly fill the voids caused by the laser radiation or to substantially coat the entire damaged surfaces such that little distortion of the light is effected when transmitted therethrough. After the mixture has evaporated to such an extent that visibility is again impaired by the existing laser damage, another application of the mixture to the acrylic glazing will immediately restore its transparency, the procedure being repeated until conditions no longer require the mixture.

The preferred proportions of the volume mixture of tetrachloroethylene and trichloroethylene is about 50 to 50, but any combination thereof which approximates the actual refractive index of the particular acrylic glazing material will be satisfactory. The refractive index of any mixture, of course, may be easily determined by means of a refractometer.

It should be borne in mind that fluids having a lower index of refraction than the acrylic, such as water, ethylene glycol, glycerine, etc., are completely unsatisfactory in temporarily restoring transparency to the damaged acrylic, as well as fluids having higher indices, such as carbon disulfide, ethylenediamine hydrochloride, phenyl p-tolyl ketone, and the like.

It is apparent from the foregoing description that we have provided means readily available to operators of military helicopters whose visibility through acrylic glazing has been substantially impaired by thermal or laser radiation by restoring visibility through the glazing even for a limited time but sufficient for the operator to identify landmarks to thus prevent loss of orientation to the aircraft. And since warfare employing laser radiation is expected to increase markedly, this contribution is considered an important invention in the defense armamentarium of the United States Government.

We claim:

1. Method for rapidly restoring temporary visibility thru acrylic glazing of military helicopters and the like, said glazing having been rendered opaque or frosted by laser radiation, said method comprising
   suitably applying a mixture of liquid tetrachloroethylene and liquid trichloroethylene to said glazing such that the refractive index of said mixture approximates the refractive index of said acrylic glazing.

2. The method as described in claim 1 further characterized by the steps of continually repeating said application step whenever said mixture evaporates sufficiently from said acrylic glazing to again present its frosted or opaqued condition.

3. The method as described in claim 1 wherein said mixture comprises about 50 percent by volume of liquid tetrachloroethylene and liquid trichloroethylene.

* * * * *